United States Patent [19]

Alldredge

[11] 4,422,544
[45] Dec. 27, 1983

[54] CONVEYOR SYSTEM WITH BI-PLANAR CHAIN

[76] Inventor: Robert L. Alldredge, 130 Pearl St., Denver, Colo. 80203

[21] Appl. No.: 264,632

[22] Filed: May 18, 1981

[51] Int. Cl.³ .............................................. B65G 15/60
[52] U.S. Cl. ................................... 198/838; 198/860; 198/861
[58] Field of Search ............... 198/860, 861, 864, 845, 198/820, 821, 831, 836, 838

[56] References Cited

U.S. PATENT DOCUMENTS

| | | | |
|---|---|---|---|
| 2,818,965 | 1/1958 | Horth | 198/838 |
| 3,508,642 | 4/1970 | Standley et al. | 198/836 |
| 3,934,708 | 1/1976 | Kambara | 198/838 |
| 4,144,965 | 3/1979 | Alldredge et al. | 198/838 |

FOREIGN PATENT DOCUMENTS

| | | | |
|---|---|---|---|
| 2441912 | 3/1976 | Fed. Rep. of Germany | 198/861 |
| 1379916 | 1/1975 | United Kingdom | 198/860 |

Primary Examiner—Joseph E. Valenza
Assistant Examiner—Jonathan D. Holmes
Attorney, Agent, or Firm—Kyle W. Rost

[57] ABSTRACT

A conveyor system employs a belt of the type having load carrying areas and yieldable areas in alternating sequence such that the belt can flex to follow a serpentine path. The belt travels along a path established by a cruciform track containing a pulling chain having alternating horizontal and vertical links, each link being joined to a roller carriage at each of its opposite ends such that each carriage includes both a horizontal and a vertical pivot axis with rollers on each axis for operating in the cruciform track. The axes are substantially coplanar with each other and with the yieldable areas of the belt, and each belt section is connected to a link. The track may be split into longitudinal halves joined to a common web by fasteners alternately removable from opposite track halves for service access to the interior of the track without disassembly of the entire track from the web. Support leg structures attached to the web carry the track for vertical, horizontal, and turn positioning of the track, and complete covers may enclose the track and belt. Expansion joints permit small variations in the length of track runs. Intermediate powered drive units engage the chain in a reliable manner to permit relatively long lengths of track runs with a relatively large number of degrees of turn.

7 Claims, 8 Drawing Figures

CONVEYOR SYSTEM WITH BI-PLANAR CHAIN

BACKGROUND OF THE INVENTION

1. Field of the Invention

The invention relates to power driven conveyors and more specifically to endless conveyors wherein the upper and lower runs of the same belt travel in vertically aligned, laterally bending paths. The invention also relates to endless conveyors having a carrier belt structure including pivotally interconnected rigid links, wherein separate pins interconnect links, the links pivoting about mutually perpendicular axes having interfitted ends.

2. Description of the Prior Art

Conveyors employing convoluted belts able to flex both horizontally and vertically are known for use in following a curved path, which may include horizontal curves, vertical curves, and spiral curves.

In one known embodiment which may be referred to as a "roller" type of flexible conveyor, such conveyors follow a path defined by a pair of channel shaped rails that are engaged by rollers or wheels that in turn carry the conveyor belt. The belt itself is constructed from a plurality of molded flexible pan sections that are longitudinally joined to define an endless belt of the desired length. The belt pans are carried on carriages, which may be joined to the belt at the junctions of the pan sections. Each carriage supports two pairs of rollers, one pair engaging each of the rails and having perpendicular axes to support the conveyor both horizontally and vertically. The carriages are joined by a standard link chain consisting of a series of generally ellipsoidal-shaped links, and the chain is used to pull the conveyor belt and carriages along the path defined by the rails. Roller type conveyors as described are taught in U.S. Pat. No. 2,701,050 and with further variation in U.S. Pat. No. 4,144,965.

The roller type of conveyor is well suited for moving heavy loads and for following a path wherein the curves are of relatively large radius and the elevation within the capability of the chain. The use of standard link chain to drive the conveyor places necessary limitations on conveyor design, such as limitations on the radius of acceptable curves and the degree of vertical rise. When the belt and chain twist, either deliberately to permit passage around a compound curve or accidentally because of an unbalanced load on a pan, the contact between links approaches a one-point, two-point, or line contact, resulting in high unit forces at those contact points, wear on the chain, and reduction in chain life. In order to gain an acceptable chain life, the link chains are surface hardened, which is a difficult process to accomplish well. Also, in order to prevent the pans from tilting too much under unbalanced load, the rails are widely spaced. Consequently, the carriages must be large to span the distance between the rails. The weight of such large carriages in turn limits the maximum elevation to which the conveyor can rise because the weight of the moving parts plus the load will exceed the allowable weight on the chain.

The curvature of the conveyor path with roller-type conveyors is also limited by the chain tension when a link chain is employed. Specifically, the roller force against the rails limits the acceptable curvature, as roller forces are directly proportional to the chain tension and the distance between rollers and are inversely proportional to the radius of the curve and the number of rollers in contact with the rail. While a closer carriage spacing would reduce roller force, it would increase overall conveyor weight and reduce maximum elevation of the run. Design experience has shown that the advantages of lowering conveyor weight and reducing cost outweigh the benefits of closely spacing the carriages so as to permit small radius curves in the conveyor track; and hence, the roller type of flexible belt conveyor is best suited for wide radius curve applications because of chain tension limitations.

Another known embodiment of such conveyors which may be referred to as a "slide" type of flexible conveyor, the conveyor path is defined by a central slide channel that is engaged with the actual conveyor chain. This chain is of special design and is formed from alternating double and single vertical bar links that are joined by cross pins having a loose fit. Twisting of this type of chain produces high unit forces between the pin and bar links, and again the chain is surface hardened to increase chain life. Excessive tipping of the conveyor belt and excessive twisting of the chain are prevented by the presence of side flanges associated with the central channel and side skids or rollers associated with the belt. The skids are positioned to strike the flanges before tipping becomes so great that the load is lost from the belt or the chain is twisted beyond the maximum acceptable degree. Such a conveyor is taught in copending U.S. patent application No. 74,345.

The slide type of conveyor has a larger friction factor than the roller type, and the chain tension of the slide type increases in curves more rapidly than that of the roller type. However, the conveyor forces against the central channel in the slide type are distributed over a large surface area, resulting in very low wear on the slide surfaces. The slide type conveyor finds best application with lighter loads as compared to the capability of roller type conveyors, and the combination of track elevation, curvature, and length must be kept within the limitations of the chain. In both roller and slide conveyors, an intermediate drive would remove many of these limitations. However, a practical, reliable intermediate drive for use with either of the types of chains used in the prior art conveyors is not yet known.

Although both the roller and slide types of conveyors are capable of similar serpentine twisting, as explained above, these two types of conveyors are best suited for different load ranges, and both types must observe practical limitations on conveyor length, elevation, and degrees of curvature. It is desirable to create a conveyor having load handling capabilities intermediate to the capabilities of the above described slide and roller type conveyors, and having the capability to negotiate many degrees of curvature and long lengths.

A conveyor of this description is proposed in U.S. Pat. No. 3,934,708, wherein a rectangular rail contains the chain, carriages and rollers therein. The carriages of this design may be light in weight and the rollers may be clamped to every other link of the chain for roller spacing equal to the length of each conveyor belt pan. However, the chain in this construction continues to be standard link chain formed from alternating vertical and horizontal ellipsoidal chain links. The roller axes must in this design be between the pivot points of the links, and the links will have point-contact or line-contact on some curves. Because the carriage is on and around the alternating chain links, the carriage will approach close to the pivot point of the chain on curves and, thus, the radius of turn is limited. Further, drive and idler sprockets have their teeth riding between the side of the chain's horizontal links and apply concentrated pressure against the load-bearing links. Still another unresolved problem with this structure is that in those embodiments having both horizontal and vertical rollers in the same carriage, one type of such rollers is proposed to be inside the other, so that the vertical rollers are a different size than the horizontal rollers.

The conveyor chain utilized in the present invention, as will be described in greater detail, has been used in overhead monorail systems wherein the chain supports depending hangers that, in turn, carry a load. This chain is a product of Millers Mechanical Equipment Ltd., New Zealand. The present invention relates to a special adaptation of this chain for operation with a conveyor belt carrying a load positioned over the chain. The above noted problems of the prior art are overcome by creation of a belt or pan conveyor that is now able to follow a serpentine path having a large degree of curvature and long length, as described below.

SUMMARY OF THE INVENTION

A conveyor of the type adapted to carry a load from under the load along a serpentine path employs a belt having a plurality load carrying areas and yieldable areas in alternate sequence, with the belt following a track defining a course of travel. The track is cruciform in transverse cross-section and contains a pulling chain of the type employing links formed from pairs of elongated link members in alternating horizontal and vertical sequence, each link being pivoted at its opposite ends to roller carriages having oppositely extending pairs of vertical and horizontal cylindrical axles, which axles provide pivot surfaces for the link members and also carry rollers that engage the inside surfaces of the cruciform track. The pivot axes and roller axes are colinear on each horizontal or vertical pair of axles, with both colinear axes intersecting substantially at the centerline of the chain and defining a transverse vertical plane passing through a yieldable area of the belt. Belt carriages are joined between the links and the belt with a preferred ratio of one link to each repetitive belt section, each section having a belt carriage connecting it to a link, and the length of each link from centerline to centerline being substantially identical to the length of a repetitive belt section. In one design, the track is longitudinally split into halves joined independently to a web that may unite upper and lower run rails into a single structure. For access to the chain, the rail halves may be independently removed from the web. Each rail is mounted to the web by headed fasteners passing through aligned holes in the rail half and web, with alternate holes in the rail half being larger in diameter than the fastener head, thereby permitting the rail half to be removed from the web without removing such alternate fasteners, and those alternate fasteners may attach the mating rail half to the web and thereby help to maintain the beam strength of the track assembly. Support leg structures carry the track assembly and have independent adjustments for vertical, horizontal, and turn positioning of the track. Because the track may have very long runs, expansion joints are provided in the rail. Complete covers may enclose both upper and lower runs.

The main object of the invention is to create a conveyor capable of having many degrees of turn in its course of travel, with moderate exponential increase in chain tension in passage around turns. This is achieved by combining a belt adapted to follow a serpentine path with a chain capable of laterally supporting the belt in both straight and curved track sections and that can use rollers having a low friction factor.

An important object is to provide a conveyor capable of carrying light and intermediate loads over long distances with the capability of negotiating curves in the course of travel. A relatively light weight chain and light weight belt carriages help to maintain acceptable chain tensions for long conveyor runs, and the chain accepts intermediate powered drive units in a manner permitting the ready use of as many such units as may be required for the desired length of the conveyor run.

A further object is to create a track assembly for an enclosed pulling chain that permits ready access to the chain. A rail having the ability to be partially removed without disturbing other rail sections provides the desired access and also simplifies assembly of the track structure. Further, support legs for the track and conveyor may have an open design that readily allows hoods to be placed around the conveyor system and to be pivoted open when access is required.

These and other objects are achieved as described in the following detailed explanation.

DESCRIPTION OF THE PREFERRED EMBODIMENT

Figure 1:
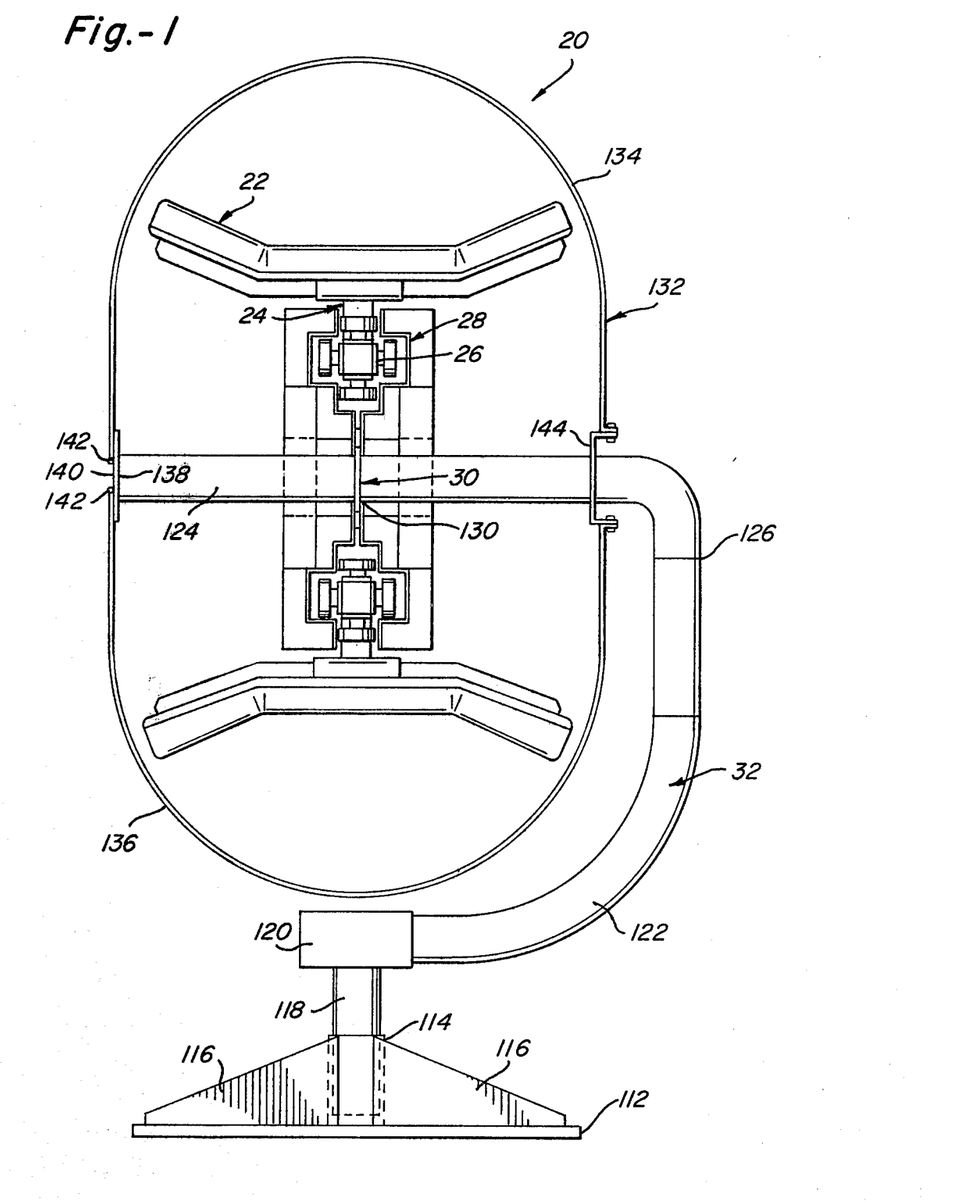
FIG. 1 is a vertical transverse cross-sectional view of the conveyor assembly.
Figure 2:
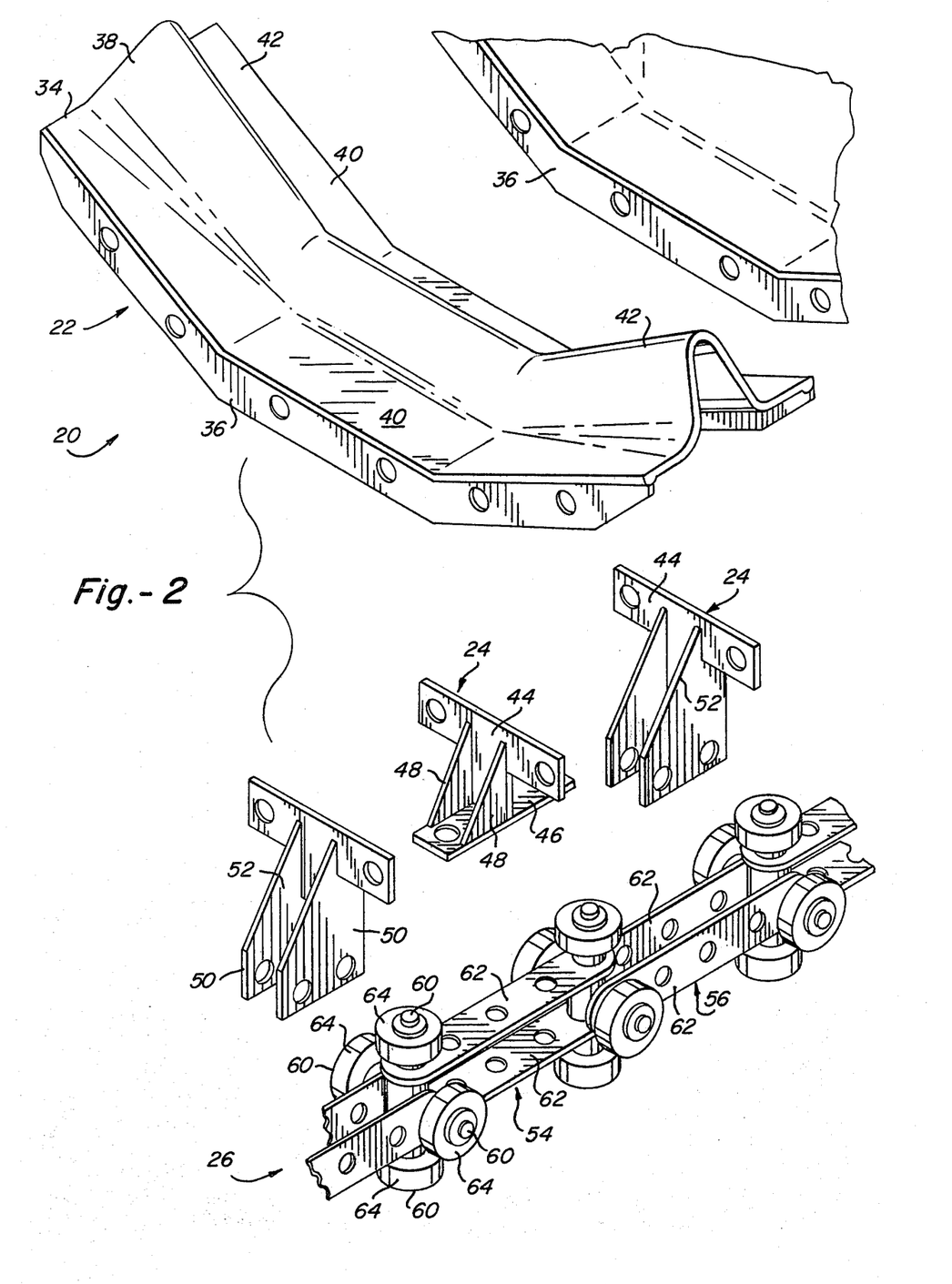
FIG. 2 is an exploded view of the belt, belt carriages, and chain.

With initial reference to FIGS. 1 and 2, the conveyor system 20 is shown to be of the belt type wherein a flexible endless belt 22 is carried upon belt carriages 24 that interconnect the belt to a pulling conveyor chain 26. This chain, in turn, is supported in the desired path of conveyor operation by a single track 28. When the belt 22 is in position to carry a load, the belt is over the rail and travels in an upper run of the conveyor, while when the belt is returning without a load, the belt is below the rail in a lower run. Although it is not necessary that the upper and lower runs be closely associated, a support web 30 intermediate to the two runs may unify the rail 28 of both runs into a firm structure. In addition, the web 30 provides a mounting point for support legs 32 holding the conveyor rail in the desired pathway.

The endless belt 22 is divided into a connected series of load carrying pan areas, and may be constructed from a plurality of repetitive belt sections 34 that are joined by bolting together end-to-end integrally molded flanges 36 of neighboring sections, thus allowing the belt to be repaired by individual replacement of such sections. Each section may include a transverse central fold or convolution 38 of rubber providing a flexible area allowing the belt to stretch or compress when passing through a curve. In the longitudinal direction of belt motion, the central fold may be bounded by a pair of longitudinally flat belt portions 40 of rubber-coated steel which, when joined to the similar portion 40 of a neighboring section, cooperatively form a pan for carrying the conveyor load. To aid in retention of the load, the portions 40 and the fold 38 may be laterally tilted upwardly and inwardly adjacent to each edge 42. Belts of this type are known for their ability to follow a serpentine path that may include vertical curves, horizontal curves, and spiral curves.

Belt carriages 24 serve as intermediate attachment means between the belt 22 and the chain 26. The carriages are capable of being extremely light in weight as compared to the carriages used in prior conveyors employing the type of belt as previously described, as it is unnecessary to support the belt from widely spaced lateral positions as has been previously done. Thus, the carriages may be formed from a T-strap portion 44 that attaches to the belt flanges 36 by a sharing of the bolts used to hold the flanges of neighboring sections together, with the top of the T-strap being approximately as wide as the central, laterally flat section of the belt. The stem of the T-strap is joined to a mounting plate of suitable design to be joined to the chain. To separate configurations of the mounting plate are required if each link of the chain is to be connected to the belt. One type employs a horizontal plate 46 perpendicular to the bottom edge of the T-strap stem and optionally supported by gussets 48. The second type employs a pair of spaced, vertical plates 50 perpendicular to the side edges of the T-strap, and such plates may include integral gusset portions 52 on one or both faces of the T-strap stem.

Figures 3, 4:
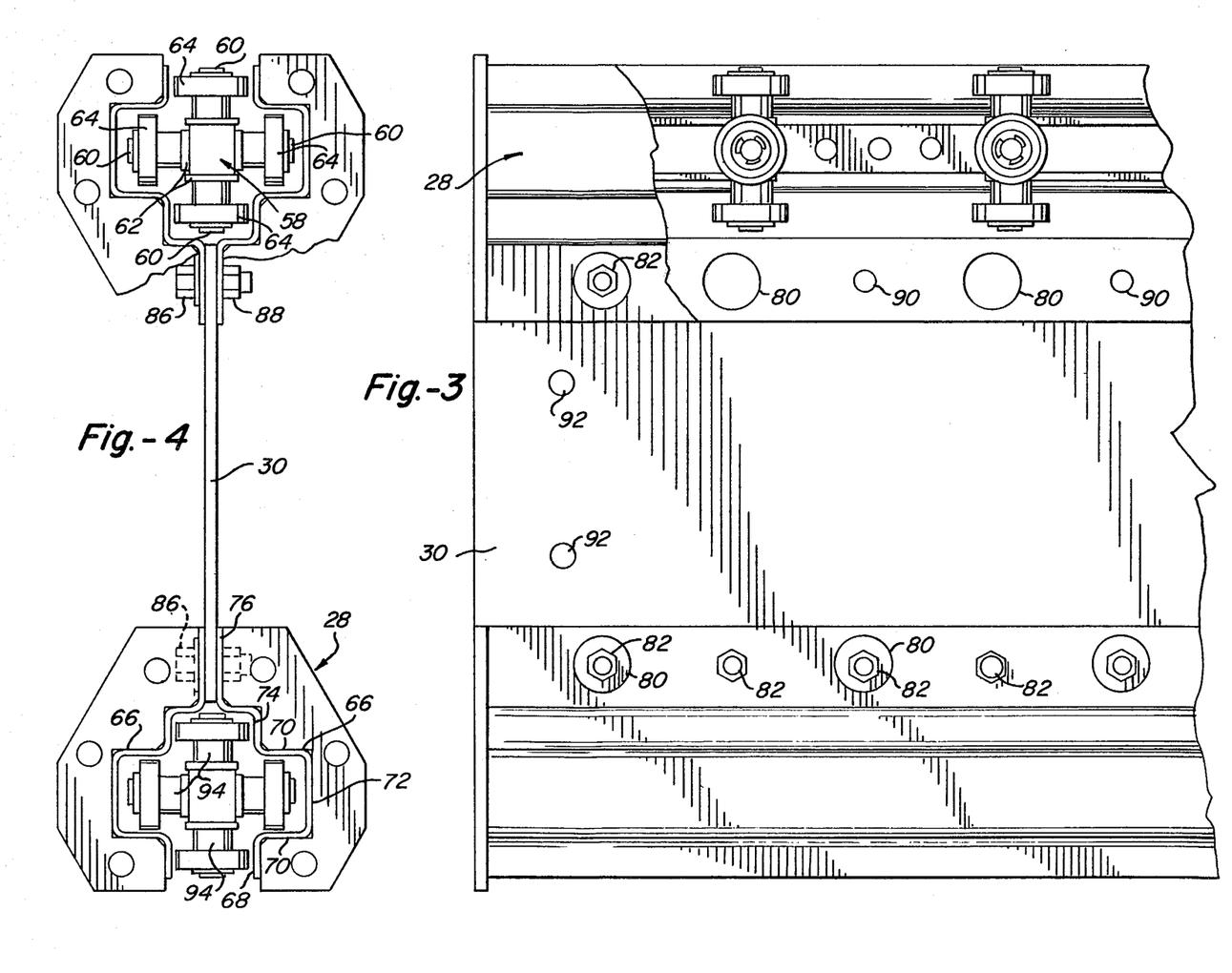
FIG. 3 is a side elevational view of the track assembly in partial section.
FIG. 4 is an end view of the track assembly of FIG. 3.

Conveyor chain 26, best shown in FIGS. 2 and 4, is constructed from alternating vertical links 54 and horizontal links 56 joined together by a cruciform roller carriage body 58 having coplanar perpendicular axes, one of which is associated with each link. The axes are best embodied as four separate cylindrical axles 60 radiating from central roller carriage body 58. The axles lie substantially in a single plane with two oppositely oriented axles lying longitudinally along each of the two perpendicular axes. Each link 54 or 56 is formed from a pair of longitudinally elongated link members 62, which may be rods, bars, plates or other joining means, either straight or otherwise configured. Each pair of members 62 is joined at each respective end thereof to one pair of colinear axles 60 on a single axis of cruciform body 58, with adjacent links being joined to mutually perpendicular axle pairs. The link members 62 are pivoted on the concentric axles 60 with a circular aperture 63 of each link member closely engaging the cylindrical surface of the axle. Each axle carries a roller 64 near the outer, free end thereof and concentric with the longitudinal axis of the axle. The rollers may be ball bearing mounted or be the bearing itself with the outer race serving as the roller surface. All rollers 64 may be of the same dimensions. It should therefore be evident that the pivot point between links of the chain 26 during bending in any direction will be a single point in body 58 lying generally on the longitudinal axis of the chain. The close fit between the link member apertures 63 and the axles prevents substantial rotation about the centerline of the chain.

Figure 5:
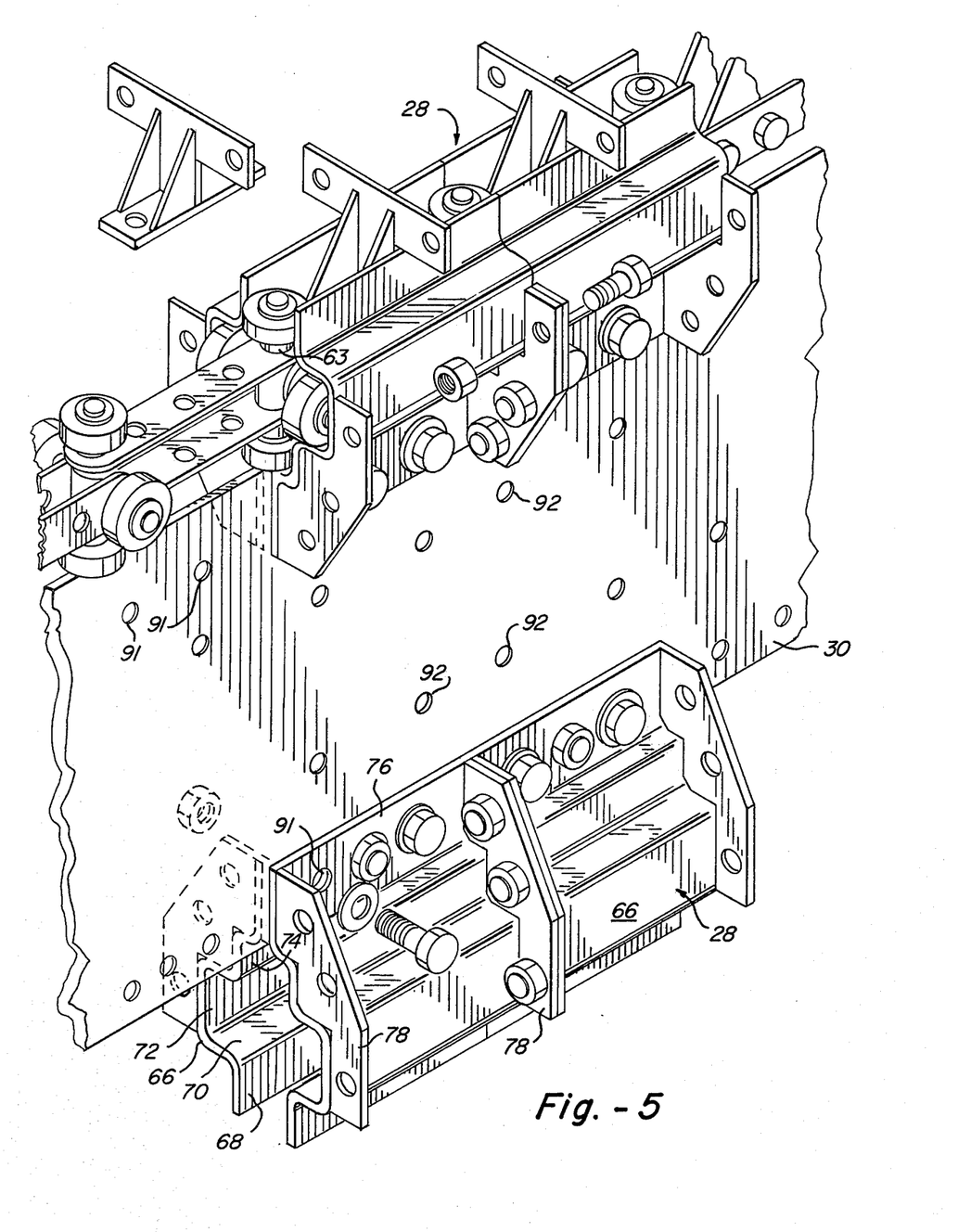
FIG. 5 is an isometric view of details of the track assembly and chain, showing the assembly of some parts.

Track 28, best shown in FIGS. 3, 4, and 5, is generally cruciform in transverse cross-section to receive the cruciform bodies 58 for longitudinal movement therein. The track or rail may be formed from two matching side halves 66, each defined by four running surfaces for the rollers 64. One such running surface 68 of each half defines one side of an opening in the rail through which the carriages 24 connect the belt to the links and also serves as one-half of the containment for a top or outer roller on a vertical axis. A pair of running surfaces 70 joined by an intermediate wall 72 define the operating channel for one side roller on a horizontal axis. A final running surface 74 provides one-half of the containment for the second or inner roller on a vertical axis, and this surface is connected to a joining flange 76 for bolting together opposite rail halves. The rail halves 66 may be of any desired length, and they may be joined in longitudinal sequence by track splice flanges 78 welded to opposite ends of each rail section.

The rail halves are joined both to each other to form entire cruciform rails and to a support web 30 to join upper run rail and lower run rail into a single assembly. Rail joining flange 76 of each rail section defines a repeating sequence of an even number of evenly spaced holes of alternating large and small diameter, with the large diameter holes 80 being of greater diameter than the head 82 of fastener 84, which may be a bolt 86 or nut 88, while the smaller diameter holes 90 are of smaller diameter than the fastener heads, although they are able to receive a bolt shank. The support web 30 may define a similarly spaced sequence of holes 91 smaller than the fastener heads. By this arrangement of holes in the rail halves and web, the rail assembly may be assembled or disassembled with remarkable ease. Identical prefabricated straight rail halves will mate when placed in mirror image relationship, with a large hole 80 of one rail half aligning with a small hole 90 of the other and vice versa, and all such holes aligning with holes 91 of the web. The rail is assembled by placing bolts through all such holes and fastening them with nuts. This effectively forms the entire rail from the two halves, although, in fact, each half is independently bolted to the web 30 by every other bolt, while the opposite half is bolted to the web by the intermediate bolts. If servicing or repair is necessary on the track or chain, the necessary area can be reached by removing a section of the one-half of the track. The remaining track half provides support to the chain rollers and contributes to the beam strength of the rail assembly. The half to be removed is freed from the rail assembly by unbolting the track splice flanges 78 and removing the bolts 86 passing through the smaller holes 90 of the joining flange 76. The chain is thereby exposed for servicing, or the half rail section can be replaced with another by the reverse process. Web sections are joined together by lap plates bolted through further web holes 92 closer to the web centerline than holes 91.

Figure 7:
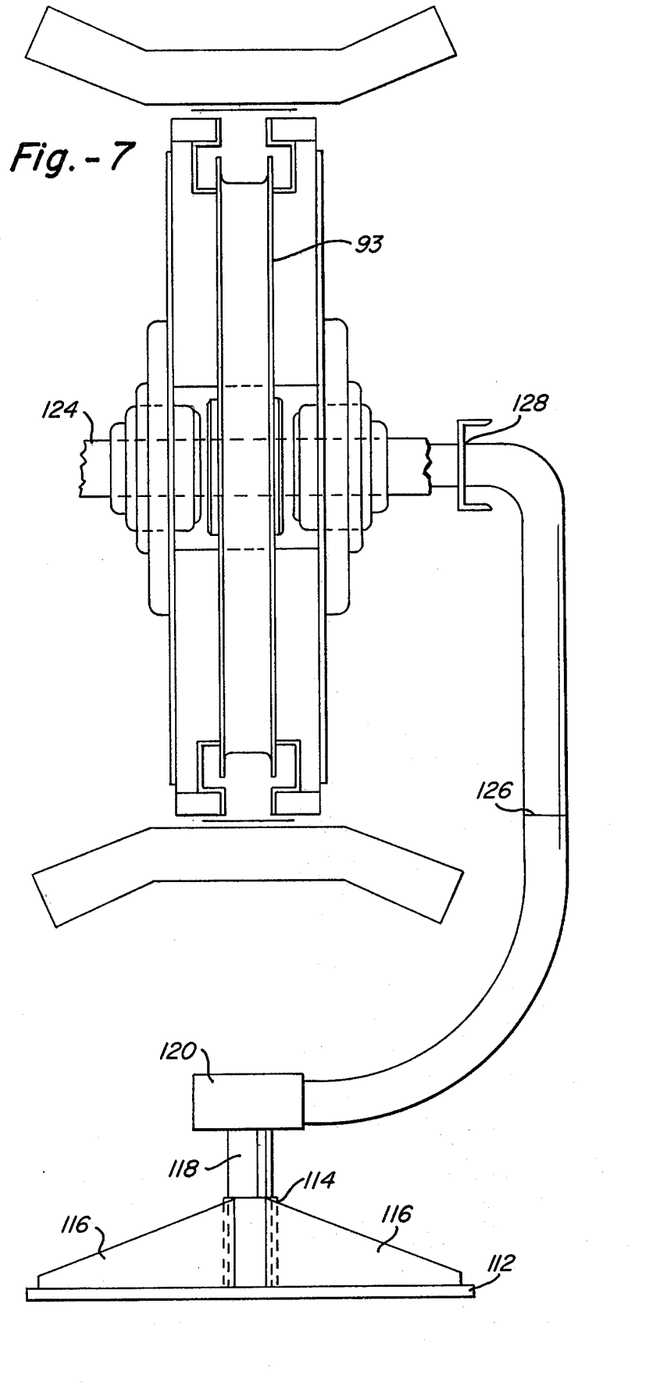
FIG. 7 is an end view in partial section of the conveyor system, showing a drive unit.
Figure 8:
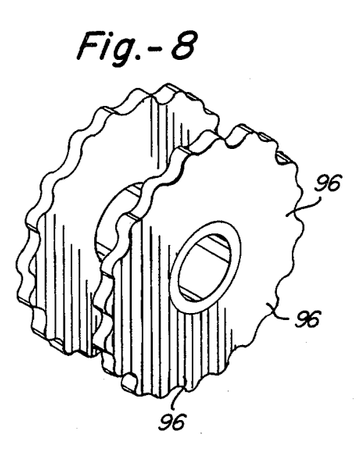
FIG. 8 is a fragmentary isometric view showing details of a drive sprocket.

The conveyor is adapted for use in long runs as made possible by a power driven main drive 90, shown in FIGS. 7 and 8 as a specially configured sprocket wheel, plus such auxiliary drives as may be needed according to the total length of the rail assembly. The auxiliary drives may be "caterpiller" drives, which are known for that purpose. The cruciform chain roller carriages 58 provide the engagement point for either type of drive. Conventional motors power either type of drive in well known manner. As best shown in FIG. 4, the link members 62 pivotally connect to the axles 60 adjacent to the central roller carriage body 58, while the wheels 64 are attached near the free ends of the axles, leaving an intermediate axle length between the wheels and the link members. The cylindrical axles carry sleeves 94, which are capable of rotation on the axles. These sleeves provide a durable contact point for the main drive 93 and any intermediate drive units. Either sprocket drive or caterpillar drive of known configuration can be used, either type employing a pair of forks 96, FIG. 8, to simultaneously engage the two sleeves 94 of the axles lying on one axis, for example the horizontal axis. The forks may cause the sleeves to rotate on the axle when contacted, thereby dissipating forces and preventing wear on a single spot of the axle or sleeve. An important aspect of this drive arrangement is that contact between the drive and the chain is against cylindrical surfaces of relatively large area, and contact between chain links is also between cylindrical surfaces. The chain never bears forces on point-contact, line-contact, or saddle shaped contact surfaces as will happen with standard ellipsoidal shaped chain links.

Figure 6:
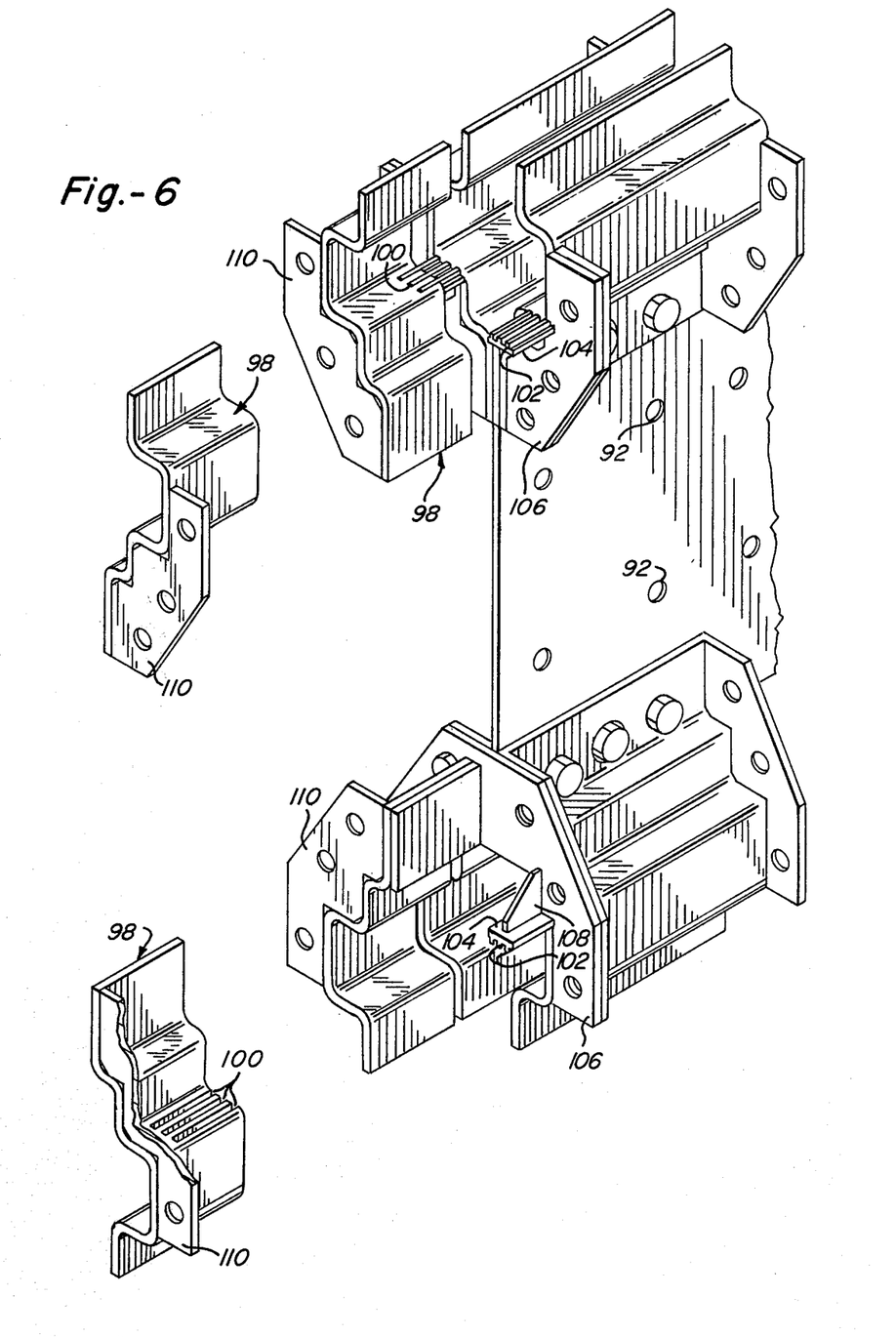
FIG. 6 is an isometric view of the track assembly, partially exploded, showing an expansion joint.

When especially long distances of rail are employed, provision is made for expansion of the rail by providing expansion joints as shown in FIG. 6. A short track segment 98 is provided with a plurality of longitudinal slots 100 formed in the running surface 70 closest to the joining flange 76. A complimentarily configured plurality of ribs 102 supported on base plate 104 is attached to the rail assembly by a splice joint flange 106, and a gusset 108 may hold the ribs and base plate in position. The rail segment 98 is attached to further sections of the track by another splice joint flange 110, but remains capable of longitudinal sliding with respect to flange 106 in response to expansion and contraction of the rail. Other types of expansion joints are also possible, such as interfitting teeth or prongs.

Initial assembly of the conveyor along the desired serpentine path is aided by adjustable support legs 32 shown in FIGS. 1 and 7. These legs are each defined by a base member 112 supporting a vertically oriented socket 114 maintained in position by a plurality of gusset plates 116. The socket 114 telescopically receives vertical tubing stem 118, which at its top supports perpendicular horizontal socket 120. Curved arm 122 is telescopically received in socket 120 and extends laterally and upwardly relative to the longitudinal conveyor path, covering an arc of approximately ninety degrees. Conveyor support bar 124, FIG. 1, is connected to web 30 along a horizontal portion of the bar and is pivotally connected to arm 122 at a vertical end of the bar, defining pivot 126. As shown in FIG. 7, the support bar may further define a pivot point 128 in the horizontal portion of the bar. When the conveyor is being assembled, the various pivot points and sockets in the support legs 32 allow the serpentine path to be established while avoiding excessive stress in the rail assembly. Grade variations are accommodated by selecting an appropriate degree of engagement between stem 118 and socket 114, after which the stem may be welded into the socket at the desired position. Similarly, the horizontal lateral position of the rail assembly is adjusted at socket 120, after which arm 122 is welded in place. Any required degree of turning in the horizontal plane is adjusted at pivot point 126, while tilting in the vertical plane is adjusted at pivot point 128 or at intersection 130 of the bar 124 and web 30, after which these points may be welded.

The conveyor as thus described is substantially lighter in weight than most previous conveyors adapted to follow a serpentine path. The relatively open structure of the support legs is made possible by such lightness, and this, in turn, permits a cover 132 to efficiently encircle the conveyor along its path. The cover may be constructed from an upper hood 134 and a lower hood 136. The free end 138 of bar 124 as shown in FIG. 1 extends beyond the width of belt 22 and carries a cover mounting plate 140 to which is attached a pair of hinges 142. Each cover is attached to one of the hinges 142. At the opposite side of the conveyor, bar 124 also extends beyond the width of the belt and carries a second mounting plate such as channel 144 having an upper and lower flange. The cover may be fastened to these flanges by suitable fasteners such as bolts and locknuts. Any cover section may be opened by swinging the cover on its hinge 142, or the cover may be entirely removed by removing the hinge pins. With the cover in place, the conveyor belt is protected from many types of abuse, and carried material lost from the belt is contained in the cover. A further benefit is that light weight materials such as powders or ash may be carried through outdoor areas and be protected against wind and water.

In the preferred construction of the conveyor 20, the belt 22 is formed from individual belt section 34 having a relatively short length such as eight inches (20.32 cm.). The joining flange 36 of each mating pair of segments is also attached to a carriage 24, and each carriage is bolted to a separate link member 62 via one or more holes formed in each link member for this purpose. The horizontal links 56 may have a carriage bolted to both parallel link members, while the vertical links may have the carriage bolted to only the top link member of the pair. The links are each of the same length between center lines of the pivot axes at opposite ends thereof as the length of the belt segments, with the result that the cruciform pivot bodies 58 are spaced to be substantially directly vertically aligned with the center of fold 38 of the belt segment. The close spacing of the cruciform bodies, the previously described identical length of each link member, and the concentric orientation of the pivot axes in the body 58 prevent the chain links from parallelogramming in curves and cause the belt pans to be very stable and less apt to tip when the pan is unbalanced. Curves of relatively small radius can be traversed with acceptably low chain tension and low roller forces. The roller forces are sufficiently low that roller and rail surfaces bear extremely small forces. For example, with an eight inch (20.32 cm.) roller spacing and one thousand pound (453.59 kg.) chain tension, the conveyor may pass through a horizontal curve of one hundred eight inch (274.32 cm.) radius with a roller force of only thirty-seven pounds (16.78 kg.). This force is so low that rollers 64 may be supported on unground ball bearings, producing not only a cost saving but also improved performance since ground ball bearings tend to pit if shock loaded. Further, the bearings may be loosely packed with balls, having one ball missing deliberately, for example.

The described conveyor thus provides a durable construction combining a light weight chain with a belt adapted to follow a serpentine path, and by the interaction of the chain pivot points with the belt pivot points, results in a stable belt pan surface that negotiates curves and carries unbalanced loads with very little tendency to tip. The potential number of degrees of turns and the sharpness of turns in the conveyor pathway is increased. The ability to easily apply intermediate drives to the chain with drive forces dispersed over durable rollers on cylindrical axle surfaces allows long conveyor runs to be used, and the lightness of the chain and carriages further contributes to this capability. Further, the rail assembly is well suited for prefabrication and simplified assembly and servicing.

What is claimed is:

1. An improved conveyor system of the type employing an endless conveyor belt capable of following a path having vertical and horizontal curves along the course of travel while supporting a load from below the load, wherein the improvement comprises, in combination:
   (a) a track having inside track surfaces arranged for establishing a selected course of longitudinal travel for the belt, the track including a top run in which the belt is supported over the track for carrying a load from below the load, the top run defining a longitudinal slot therein, and wherein the track is generally cruciform in transverse cross-section at said inside track surfaces; the track comprising two side halves each defining one edge of said longitudinal slot and having an apertured joining flange opposite therefrom with alternating relatively larger and smaller apertures at defined spacings, a web receivable between the joining flanges of mating track sides and apertured at like defined spacings with apertures smaller than said relatively larger apertures of the joining flanges, and fastening members having shafts receivable through said relatively smaller joining flange apertures and web apertures and having heads sized to be retained by the smaller flange apertures and web apertures while passing through the larger flange apertures, permitting the track halves to be independently attached to the web by the fastening members;
   (b) belt moving means comprising:
      (1) a pulling chain adapted to be moved along the course of travel defined by said track, wherein the chain is of the type having a series of alternating horizontal and vertical links extending along the inside of the track, with each horizontal link being formed from a pair of longitudinally extending elongated link members that are spaced apart transversely in a horizontal plane with corresponding end portions of the link members being adapted for connection to a horizontal transverse pivot axle, and with each vertical link being formed from a pair of longitudinally extending elongated link members that are spaced transversely in a vertical plane with corresponding end portions of the link members being adapted for connection to a vertical pivot axle;
      (2) a plurality of roller carriages connected to the pulling chain between adjacent horizontal and vertical links at selected spaced intervals, said roller carriages being of the type having a main body with four axle portions arranged in coaxial pairs, one pair projecting outwardly horizontally from opposite sides of the main body portion and the second pair projecting outwardly vertically from opposite sides of the main body portion, the roller carriages having at least one support roller mounted for rotation on each of said axle portions and being contained entirely within the cruciform track and bearing on the inside track surfaces as said support roller move inside the track; and
      (3) belt carriage means jointed to the pulling chain at selected intervals and extending through said longitudinal slot to the belt for supporting the belt from below the belt along the top run of the track.

2. The conveyor system of claim 1, wherein said web is substantially vertical and defines apertures near both top and bottom edges thereof, the top run of track being attached to the top edge of the web, and further comprising a bottom run of track attached to the bottom edge of the web.

3. An improved conveyor system of the type having a conveyor belt adapted to follow a serpentine path, wherein the belt is made up of a plurality of repetitive belt sections in longitudinal sequence defining load carrying pan areas alternating with flexible fold areas, the belt following a predetermined course of travel while supporting a load from below the load, wherein the improvement comprises;
   (a) a conveyor track assembly having a top run rail and a bottom run rail each joined to a common intermediate web, said top run rail having inside track surfaces of generally cruciform transverse cross-section and defining a longitudinal slot in the top surface thereof, said top rail being divided into side halves having a depending joining flange at the bottom edges thereof, each of said flanges defining an alternating series of large and small diameter mounting holes with the large holes of one rail half aligning with the small holes of the other rail half, and the web defining holes smaller in diameter than said large holes and arranged to align with both large and small holes of each rail half, and having headed fasteners through the aligned holes, said heads being smaller than the large holes and larger than the small holes and web holes, whereby each flange is independently removable from the web by removal of fasteners through the small holes of the flange without disturbing the attachment of the other flange;
   (b) a pulling chain having links defined by alternating pairs of horizontal and vertical elongated link members and a roller carriage between sequential links and pivotally attached to both link members of each adjacent link, said carriage having two axles protruding from opposite sides thereof along a common vertical axis, each vertical axle being connected to one elongated link member of the adjacent pair of vertical link members for pivotal motion on the vertical axis, and the vertical axles each carrying a roller for rotation on the vertical axis, said carriage further having two axles protruding from opposite sides thereof along a common horizontal axis normal to the chain centerline, each horizontal axle being connected to one elongated link member of the adjacent pair of horizontal link members for pivotal motion on the horizontal axis, and the horizontal axles each carrying a roller for rotation on the horizontal axis, said horizontal and vertical axes being coplanar and said pulling chain being carried for movement within said rails with the horizontal and vertical axle rollers bearing against the cruciform inside track surfaces; and (c) a belt carriage connecting each link to a pan area of said belt, the length of each link being substantially equal to the length of a belt section.

4. The conveyor system of claim 3, wherein the plane of said coplanar horizontal and vertical roller carriage axle passes through a flexible area of the belt.

5. The conveyor system of claim 3, wherein said roller carriage axles are cylindrical in shape and said elongated link members have circular holes formed in the opposite ends thereof and closely engaged to the cylindrical axle surfaces for prevention of substantial rotation about the longitudinal axis of said pulling chain.

6. An improved conveyor system of the type employing and endless conveyor belt capable of following a path having vertical and horizontal curves along the course of travel while supporting a load from below the load, the conveyor system including a track arranged for establishing a selected course of longitudinal travel for the belt, a belt moving means having (1) a pulling chain adapted to be moved along the course of travel defined by said track, and (2) belt carriage means joined to the pulling chain at selected intervals and extending from the chain to the belt for supporting the belt from below the belt, wherein the improvement comprises: a support leg structure having (a) a base capable of supporting the conveyor against an underlying surface;
(b) a conveyor support bar having a free end and an opposite end attached to said base, the bar extending transversely to the longitudinal course of the conveyor and carrying said track;
(c) means intermediate the base and support bar for selectively adjusting the vertical height of the support bar relative to the base;
(d) means intermediate the base and support bar for selectively adjusting the horizontal position of the support bar relative to the base; and
(e) means intermediate the base and support bar for selectively adjusting the relative angle of rotation between the support bar and base.

7. The conveyor system of claim 6, wherein said conveyor support bar extends laterally beyond the width of the endless conveyor belt on each side thereof, futher comprising a first cover attachment plate at the free end thereof and a second cover attachment plate near said opposite end and laterally outside the width of the conveyor belt; and upper and lower conveyor covers connected to said first attachment plate for hinged lateral movement connected releasibly to said second attachment plate.

* * * * *